W. S. WILLIAMS.
SAW TABLE GAGE.
APPLICATION FILED OCT. 21, 1910.
1,017,632.
Patented Feb. 13, 1912.
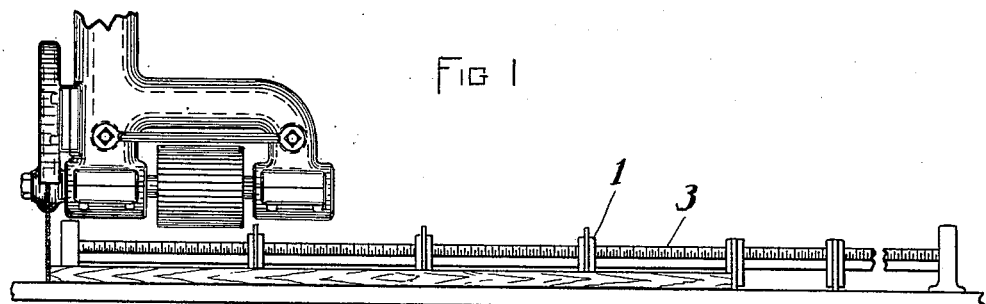
Fig 1
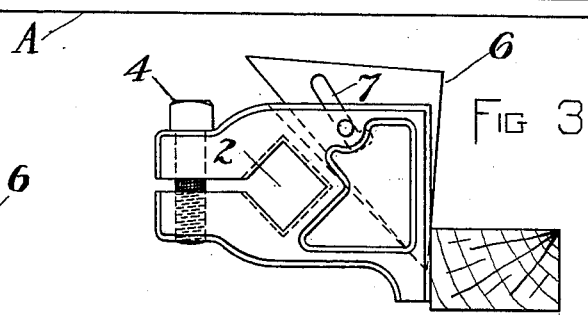
Fig 4
Fig 3
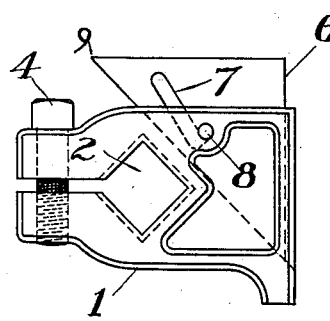
Fig 2
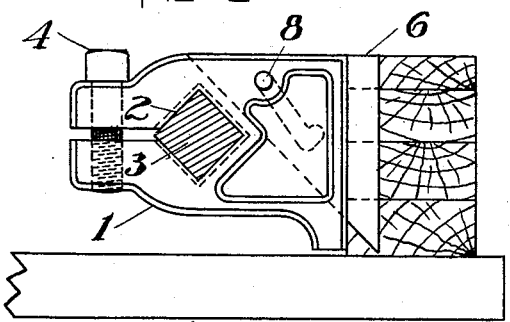
Fig 5
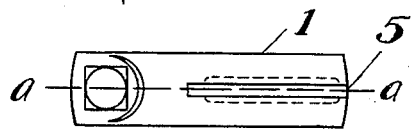
Fig 6
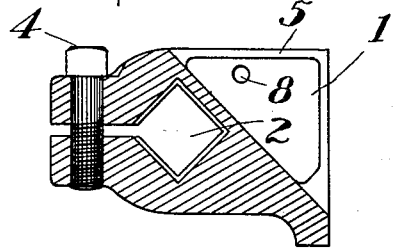
Fig 7
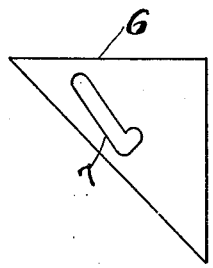
WITNESSES
E. C. Schwertman
C. A. Voit
INVENTOR
William S. Williams
By J. C. Grimes
Attorney.

UNITED STATES PATENT OFFICE.

WILLIAM S. WILLIAMS, OF CINCINNATI, OHIO, ASSIGNOR TO J. A. FAY & EGAN COMPANY, OF CINCINNATI, OHIO, A CORPORATION OF WEST VIRGINIA.

SAW-TABLE GAGE.

1,017,632.  Specification of Letters Patent.  Patented Feb. 13, 1912.

Application filed October 21, 1910. Serial No. 588,387.

*To all whom it may concern:*

Be it known that I, WILLIAM S. WILLIAMS, a citizen of the United States, residing at Cincinnati, in the county of Hamilton and State of Ohio, have invented certain new and useful Improvements in Saw-Table Gages, of which the following is a specification.

The invention relates to gages for saw tables and analogous purposes and has for its object the provision of an adjustable gage, with a stop slidably mounted therein, which may serve as a stop for the end of a board and which will project from the gage a uniform distance from the bottom to the top of the stop, so that one or more boards may be placed against the stop at the same time, and each board have an equal bearing surface.

Another object of my invention is to provide an adjustable gage with a stop which may be instantly and conveniently withdrawn from action. This is desirable in cases where the operator desires to cut off a large number of pieces of the same length. By withdrawing the stop from action he is saved the trouble of pushing the stops back each time he cuts off a board.

Another object of my invention is to provide a plurality of gages adjustably secured on a supporting rod, provided with a graduated scale, each gage being provided with a stop slidably mounted therein, one of which stops may serve as a stop for the end of a board or boards and the stops between the end of the board and the saw being so arranged that they will recede from the edge of the board, until the board comes in contact with the gage which serves as a stop or an abutment therefor.

Figure 1 is a front view of a cut-off saw and saw table embodying my invention. Fig. 2 is a side elevation of one of the gages, showing the ends of several boards against the stop. Fig. 3 is a side elevation of one of the gages acting as a stop for the edge of a board and showing how the stop will recede from the edge of the board. Fig. 4 is a side elevation of one of the gages showing the stop withdrawn from action. Fig. 5 is a top view of one of the gages without the stop. Fig. 6 is a section on line *a a* of Fig. 5. Fig. 7 is a detail of the stop.

1 represents the gage or body member which is provided at one end with an opening 2 for a supporting rod 3. The rod is provided with the usual graduating marks for setting the gage at any desired distance from the saw.

4 is a set screw for clamping the gage 1 on to the supporting rod 3.

5 is a slot in the gage in which the stop 6 is disposed. The stop 6 is provided with a slot 7.

8 is a pin passing through the gage 1 and through the slot 7 for holding the stop 6 in place in the gage 1.

The operation of my invention may be briefly described as follows:—The supporting rod 3 is provided at either end with suitable supports which are secured to the saw table A. Adjustably mounted on the supporting rod is a series of gages made in accordance with my invention, said gages being secured upon said supporting rod at any desired point. The board or boards to be cut off are placed on the table with their ends against one of the stops to determine the length of the board, and with the edge of the board or boards abutting against the gages which are secured on the rod between the end of the board and the saw. The pressure of the board against the front of the stop will cause the stop to recede as shown in Fig. 6, and allow the edge of the board to bear against the gage 1. The stops project from the gages a uniform distance from the bottom to the top of the stop so that any number of boards not exceeding in thickness the height of the stop, may be placed against the stop at one time and each board have an equal bearing surface. The stop may be withdrawn from action by simply pushing it back until the pin 8 rests in the short wing of the slot. The stop will then remain in that position and be entirely out of the way. The stop may be released and placed in action again by a slight pressure on the point 9.

Having thus fully described my invention, what I claim and desire to secure by Letters Patent is:

1. A saw table gage comprising a body member, having an opening therein for a supporting rod, and having a slot, the bottom of the slot being normally inclined from the horizontal, a stop slidably mounted in the slot in the body member, and having a face normally inclined from the horizontal sliding upon the bottom of the slot, said stop having a slot approximately parallel with its inclined edge, and a pin passing through the body member and the slot in the stop.

2. A saw table gage comprising a body member having an opening therein for a supporting rod, and having a slot, the bottom of the slot being normally inclined from the horizontal, a stop slidably mounted in the slot in the body member and having a face normally inclined from the horizontal sliding upon the bottom of the slot; said stop having an L-shaped slot therein, and a pin passing through the body member and the slot in the stop which is capable of engaging the short arm of the slot for holding the stop out of its operative position.

In testimony whereof, I have hereunto subscribed my name in the presence of two subscribing witnesses.

WILLIAM S. WILLIAMS.

Witnesses:
C. A. VOET,
R. D. COAN.

Copies of this patent may be obtained for five cents each, by addressing the "Commissioner of Patents, Washington, D. C."